US010693747B2

(12) United States Patent
Lewandowski et al.

(10) Patent No.: US 10,693,747 B2
(45) Date of Patent: *Jun. 23, 2020

(54) CREATE AND PUBLISH A WEBSITE USING A HOSTING CUSTOMER VARIABLE

(71) Applicant: Go Daddy Operating Company, LLC, Scottsdale, AZ (US)

(72) Inventors: Jared Lewandowski, Campbell, CA (US); Justin Tsai, San Francisco, CA (US); Josh Berk, Scottsdale, AZ (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 99 days.

This patent is subject to a terminal disclaimer.

(21) Appl. No.: 16/129,648

(22) Filed: Sep. 12, 2018

(65) Prior Publication Data

US 2020/0084124 A1 Mar. 12, 2020

(51) Int. Cl.
| | |
|---|---|
| *H04L 12/24* | (2006.01) |
| *G06F 16/34* | (2019.01) |
| *G06F 16/958* | (2019.01) |
| *H04L 12/58* | (2006.01) |
| *H04M 3/51* | (2006.01) |
| *G10L 15/26* | (2006.01) |
| *G06N 20/00* | (2019.01) |

(52) U.S. Cl.
CPC ........ *H04L 41/5083* (2013.01); *G06F 16/345* (2019.01); *G06F 16/958* (2019.01); *H04L 41/5064* (2013.01); *G06N 20/00* (2019.01); *G10L 15/26* (2013.01); *H04L 51/04* (2013.01); *H04M 3/51* (2013.01)

(58) Field of Classification Search
USPC ........................................................ 709/224
See application file for complete search history.

(56) References Cited

U.S. PATENT DOCUMENTS

| | | | |
|---|---|---|---|
| 2008/0140502 A1* | 6/2008 | Birnholz | G06Q 30/02 705/14.72 |
| 2010/0235411 A1* | 9/2010 | Bray | G06F 16/958 707/812 |
| 2016/0042425 A1* | 2/2016 | Mukherjee | G06Q 30/0619 705/26.62 |

\* cited by examiner

*Primary Examiner* — Hermon Asres
(74) *Attorney, Agent, or Firm* — Greenberg Traurig, LLP

(57) ABSTRACT

A website hosting provider may assist hosting customers with the creation and publication of their websites. The website hosting provider may receive and convert customer service voice communications into customer service text communications. The website hosting provider may organize the customer service text communications in clusters so that all of the customer service text communications in the same cluster are regarding the same topic. The website hosting provider may also assign a score, regarding the effectiveness, and hosting customer variables, regarding the calling hosting customer, to each customer service text communication. When a new, i.e., current hosting customer calls regarding a topic and has similar hosting customer variables, the website hosting provider may determine, based on the past customer service text communications, a set of optimal questions. The current hosting customer may respond to the questions and then receive a recommendation from the website hosting customer regarding creating or publishing their website.

18 Claims, 12 Drawing Sheets

CREATE AND PUBLISH A WEBSITE USING A HOSTING CUSTOMER VARIABLE

FIELD OF THE INVENTION

The present invention generally relates to the field of creating and publishing websites to the Internet.

SUMMARY OF THE INVENTION

The present invention provides methods for a website hosting provider to assist a hosting customer in creating and publishing a website on the Internet. The method may start by the website hosting provider receiving in a communication center a plurality of customer service voice communications from a plurality of different hosting customers and storing the customer service voice communications in a database.

The website hosting provider may convert the plurality of customer service voice communications into a corresponding plurality of customer service text communications. The website hosting provider may store the plurality of customer service text communications in the database.

The website hosting provider may derive a score for each customer service text communication in the plurality of customer service text communications based on an analysis of the customer service text communication. A higher score is assigned to customer service text communications that quickly and efficiently resolve a problem or issue for the calling hosting customer, while a lower score is assigned to customer service text communications that results in additional call-backs, never resolves the hosting customer's problem or takes an excessive amount of time in correcting the problem. In some embodiments, the calling hosting customer may assign a score based on the calling hosting customer's rating of the customer service for the telephone call.

The website hosting provider may derive a topic for each customer service text communication in the plurality of customer service text communications based on an analysis of the customer service text communication. As an example, various keywords and their frequency may be determined in each customer service text communication and compared against their frequency in the other customer service text communications to determine one or more topics 196 for the customer service text communication. In other embodiments, the calling hosting customer may select, possibly from a displayed menu, the main topic(s) of the customer service voice/text communication.

The website hosting provider may derive a plurality of hosting customer variables of the hosting customer for each customer service text communication in the plurality of customer service text communications. The hosting customer variables for a particular customer service text communication may be determined by analyzing the customer service text communication (timing the duration, counting the number of questions, analyzing the tone of the calling hosting customer, etc.), by analyzing a customer account of the current calling hosting customer (determining type of business, length of time as a customer, recent account errors or errors in updating and/or trying to publish the website) and/or by allowing the calling hosting customer to enter one or more of the hosting customer variables directly to the website hosting provider.

The website hosting provider may store the score, topic(s) and plurality of hosting customer variables for each customer service text communication in the plurality of customer service text communications in the database.

The website hosting provider may aggregate, i.e., sort into different groups, all of the customer service text communications in the plurality of customer service text communications into a plurality of different clusters. The customer service text communications may be virtually sorted (using tables or link lists to track groups) or physically sorted by placing into different files in the database. The aggregation will result in all customer service text communications in the same cluster having the same topic and no two clusters having the same topic for their customer service text communications.

The website hosting provider may receive a telephone call from a current hosting customer, where the current hosting customer is seeking help or assistance from the website hosting provider for a particular problem/issue, i.e., a topic. The website hosting provider may determine a hosting customer variables for the current hosting customer using any desired means. As non-limiting examples, the website hosting provider may determine the hosting customer variables for the current hosting customer by loading data associated with a hosting account of the current hosting customer or by asking the current hosting customer to enter their hosting customer variables.

The website hosting provider may apply a machine learning algorithm to a cluster of customer service text communications that have the same topic as the topic for the current customer service telephone call made by the current hosting customer to determine an optimal set of questions. The optimal set of questions are preferably based on the hosting customer variables for the current hosting customer and the score for each customer service text communication in the first cluster of customer service text communications. Thus, at a high level, questions that were effective in the past for the same topic and for other hosting customers with similar hosting customer variables as the current hosting customer are more likely to be selected as optimum questions while questions that were ineffective in the past for the same topic and for other hosting customers with similar hosting customer variables are less likely to be selected as optimum questions.

The website hosting provider may display on a client device the optimum set of questions to the current hosting customer. The website hosting provider may receive a plurality of responses to the optimal set of questions from the current hosting customer.

The website hosting provider may use the responses to the optimal set of questions to determine one or more recommendations for the current hosting customer using and desired method. The recommendations will typically be related to creating and/or publishing the website of the current hosting customer. As non-limiting examples, the website hosting provider may feed the responses to the optimal set of questions into a software algorithm, a machine learning engine, artificial intelligence (AI) or a neural network to determine one or more recommendations.

The website hosting provider may transmit the one or more recommendations to the client device of the current hosting customer, where the recommendations are based on the plurality of responses from the current hosting customer.

The website hosting provider may publish a website of the current hosting customer on the website hosting server. The current hosting customer may have used the recommendations to create or publish the website.

The above features and advantages of the present invention will be better understood from the following detailed description taken in conjunction with the accompanying drawings.

DETAILED DESCRIPTION

Figure 1:
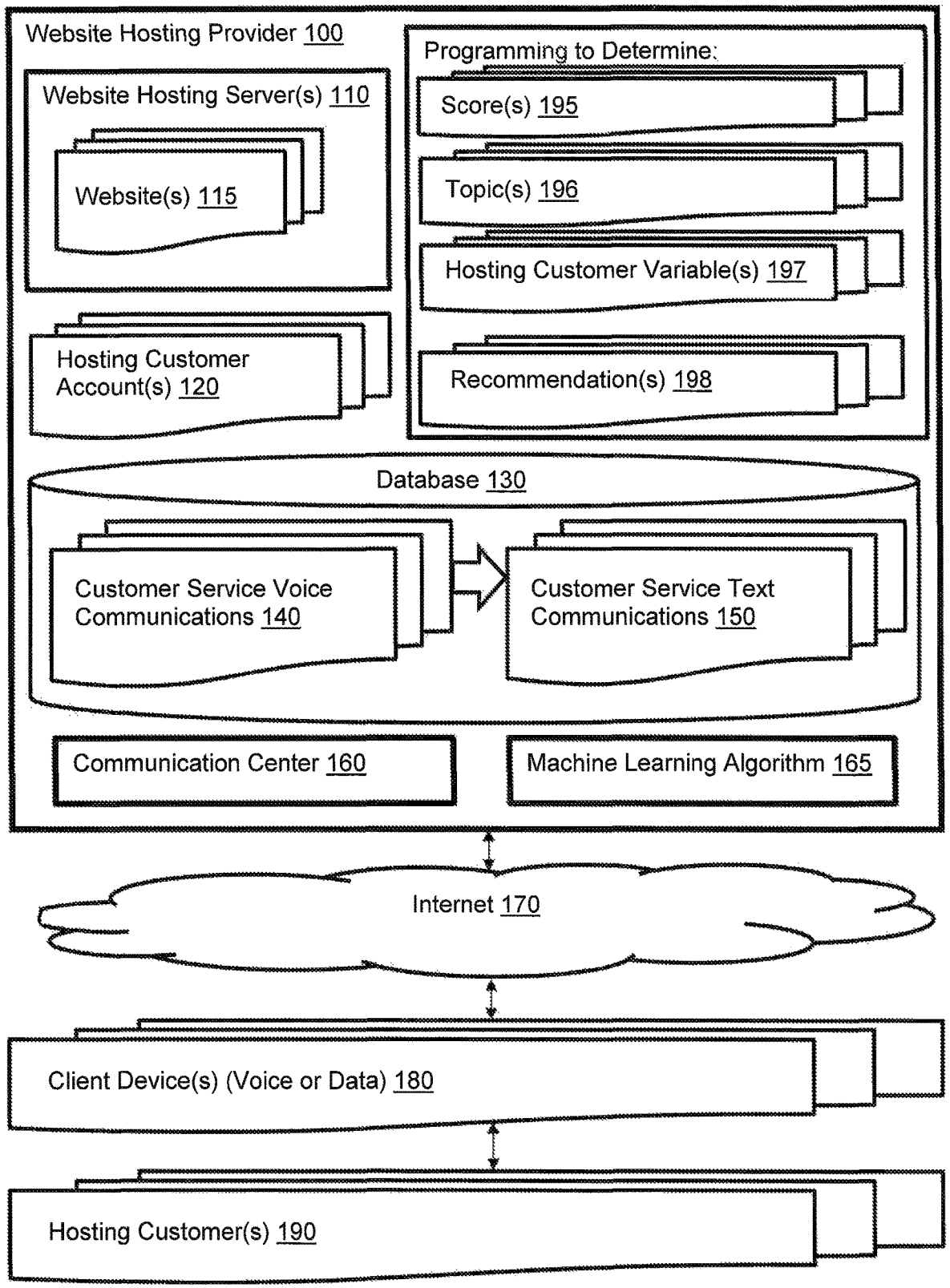
FIG. 1 is a block diagram illustrating the components in a website hosting provider and how the website hosting provider is in communication with a plurality of hosting customers.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

FIG. 1 is a block diagram of a system that may be used to practice the present invention. The arrows in FIG. 1 represent computer networks and/or communication paths between computer networks. A computer network is a collection of links and nodes (e.g., multiple computers and/or other client devices 180 connected together) arranged so that information may be passed from one part of the computer network to another over multiple links and through various nodes. Examples of computer networks include the Internet 170, the public switched telephone network, the global Telex network, computer networks (e.g., an intranet, an extranet, a local-area network, or a wide-area network), wired networks, and wireless networks.

The Internet 170 is a worldwide network of computers and computer networks arranged to allow the easy and robust exchange of information between websites 115 hosted by website hosting providers 100 and computer users on client devices 180. Billions of people around the world have access to client devices 180 connected to the Internet 170 via Internet Service Providers (ISPs). Content providers, i.e., hosting customers 190, place multimedia information (e.g., text, graphics, audio, video, animation, and other forms of data) at specific locations on the Internet 170 referred to as websites 115. The combination of all the websites 115 and their corresponding webpages on the Internet 170 is generally known as the World Wide Web (WWW) or simply the web.

For Internet users and businesses alike, the Internet 170 continues to be increasingly valuable. More people use the web for everyday tasks, from social media, shopping, banking, and paying bills to consuming media and entertainment. E-commerce is growing, with businesses delivering more services and content across the Internet 170, communicating and collaborating online, and inventing new ways to connect with each other.

Prevalent on the Internet 170 are multimedia websites 115, some of which may offer and sell goods and services to individuals and organizations. Websites 115 may consist of a single webpage, but typically consist of multiple interconnected and related webpages. Websites 115 may reside on one or more hardware servers and are typically prepared, maintained, controlled and owned by a single individual or entity. The operator/owner of the website 115 may be a hosting customer 190 of a website hosting provider 100. The single individual or entity is usually a domain name registrant of the domain name that points to the website 115. Menus, links, tabs, etc. may be used by website visitors with a client device 180 and browser to move between different webpages within the website 115 or to move to a different website 115.

Websites 115 may be created using HyperText Markup Language (HTML) to generate a standard set of tags that define how the webpages for a website 115 are to be displayed. Users of the Internet (website visitors) may access content providers' websites 115 using software known as an Internet browser, such as MICROSOFT INTERNET EXPLORER®, GOOGLE CHROME® or MOZILLA FIREFOX®. After a browser has located a desired webpage (through the use of the DNS or cache memory), the browser may request and receive information from the webpage, typically in the form of an HTML document, and then display the webpage content to the website visitor on the client device 180. The website visitor may send and receive information from the webpage of the website 115. The website visitor may also view other webpages at the same website 115 or move to an entirely different website 115 using the browser.

Some website operators, typically those that are larger and more sophisticated, may provide their own hardware, software, and connections to the Internet 170 to host their own website 115. However, most website operators either do not have the resources available or do not want to create and maintain the infrastructure necessary to host their own website 115. To assist such website operators, website hosting providers 100 exist that offer website hosting services to these website operators, i.e., hosting customers 190. The website hosting provider 100 typically provides the hardware, software, and electronic communication means necessary to connect multiple websites 115 to the Internet 170. A single website hosting provider 100 may literally host thousands of websites 115 on one or more website hosting servers 110.

Browsers are able to locate specific websites 115 because each website 115, resource, and computer on the Internet 170 has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The newer IP address standard, often called IP Version 6 (IPv6), is a 128-bit binary number. The standard human readable notation for IPv6 addresses presents the address as eight 16-bit hexadecimal words, each separated by a colon (e.g., 2EDC:BA98:0332: 0000:CF8A:000C:2154:7313).

A website hosting provider 100 is hereby defined to comprise website hosting servers 110, hosting customer accounts 120, programming algorithms, a database 130 storing customer service voice communications 140, a communication center 160 for receiving, transmitting and storing telephone calls and at least one machine learning algorithm 165. A machine learning algorithm 165 may be a software algorithm, an artificial intelligence (AI) or an artificial neural network.

The website hosting provider 100 comprises one or more website hosting server(s) 110. The servers may be, as a non-limiting example, one or more DELL®, Lenovo®, Supermicro®, Fujitsu®, HPE®, Cisco®, and/or IBM® servers, although other types of servers or combinations of one or more servers may also be used.

The website hosting provider 100 also comprises a plurality of hosting customer accounts 120. The website hosting provider 100 preferably has at least one hosting customer account 120 for every hosting customer 190. The website hosting provider 100, upon receiving a request from a new hosting customer 190 for a hosting account, may have a procedure on its website 115 for gaining information from the hosting customer 190 and creating a new hosting account. Over time, the website hosting provider 100 may create, store and manage a plurality of hosting customer accounts 120 for a plurality of hosting customers 190. Each hosting customer 190 may manage that hosting customer's hosting customer account 120, typically by verifying the identity of the hosting customer 190 prior to allowing the hosting customer 190 to access their hosting customer account 120. Through each hosting customer account 120, the hosting customer 190 may purchase, alter and/or manage the operation of one or more websites 115 owned and controlled by the hosting customer 190 and published to the Internet 170 by the website hosting provider 100.

Figure 11:
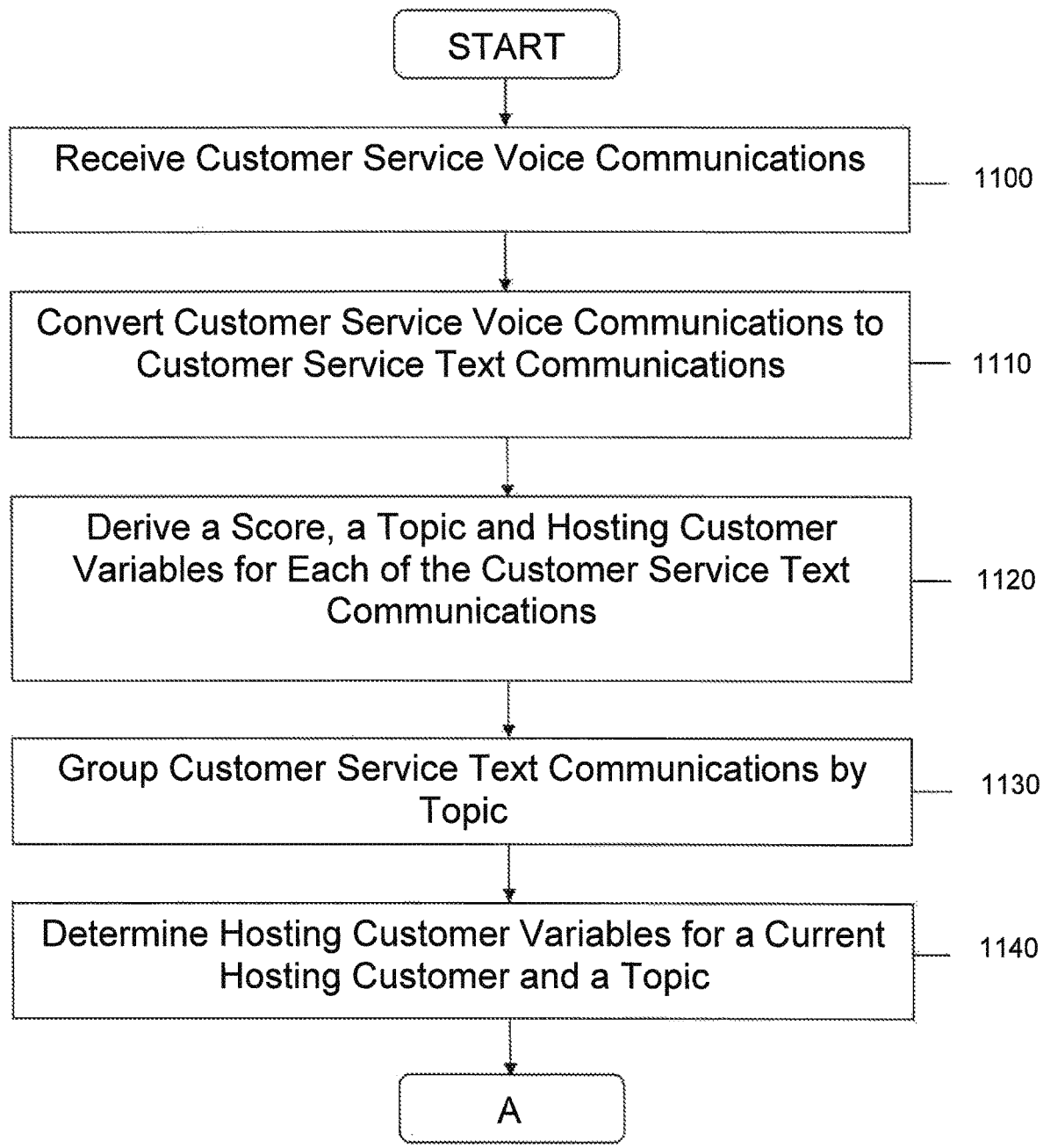
FIGS. 11 and 12 are flowcharts illustrating a process for creating and publishing a website.
Figure 12:
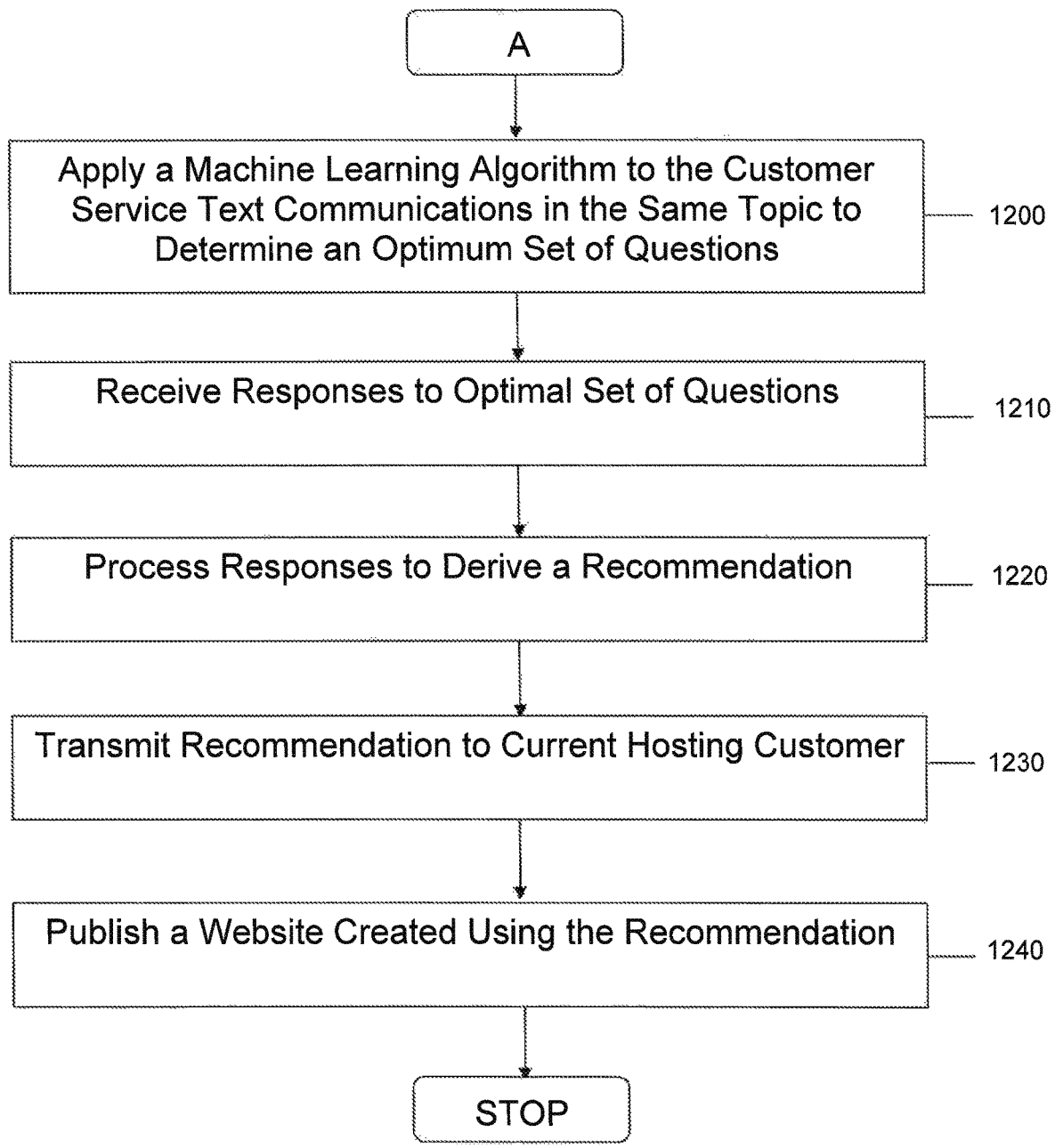

Referring to FIGS. 11 and 12, the website hosting provider 100 also comprises a communication center 160 for recording and storing telephone calls related to customer service. A hosting customer 190 that has a problem, issue or question regarding any of a variety of different topics 196 may call the communication center 160 within the website hosting provider 100 for help in creating and/or publishing a website 115 of the hosting customer 190. (Step 1100) Each hosting customer 190 is defined as a customer of the website hosting provider 100 who has a hosting customer account 120 with the website hosting provider 100 and is or will be hosting a website 115 with the website hosting provider 100.

The telephone call of the hosting customer 190 and an agent (customer service representative) regarding creating and/or publishing the website 115 may be stored in a database 130 as a customer service voice communication. As additional hosting customers 190 call the communication center 160, a plurality of customer service voice communications 140 may be stored in the database 130. The database 130 may be stored on one or more hardware servers and may be any type of desired database 130. The customer service voice communications 140 may be in any desired format. As non-limiting examples, the customer service voice communications 140 may be in an uncompressed or compressed audio format. If a compressed audio format is selected, the format may be a lossless compressed audio format or a lossy compressed audio format. As specific examples, the audio format of the customer service voice communications 140 may be in a Waveform Audio File (WAV), MPEG-1 Audio Layer 3 (MP3), Windows Media Audio (WMA), Pulse-Code Modulation (PCM), Audio Interchange File Format (AIFF), Advance Audio Coding (AAC), OGG (Vorbis), Free Lossless Audio Codec (FLAG), Apple Lossless Audio Codec (ALAC) or any other desired audio format.

Figure 2:
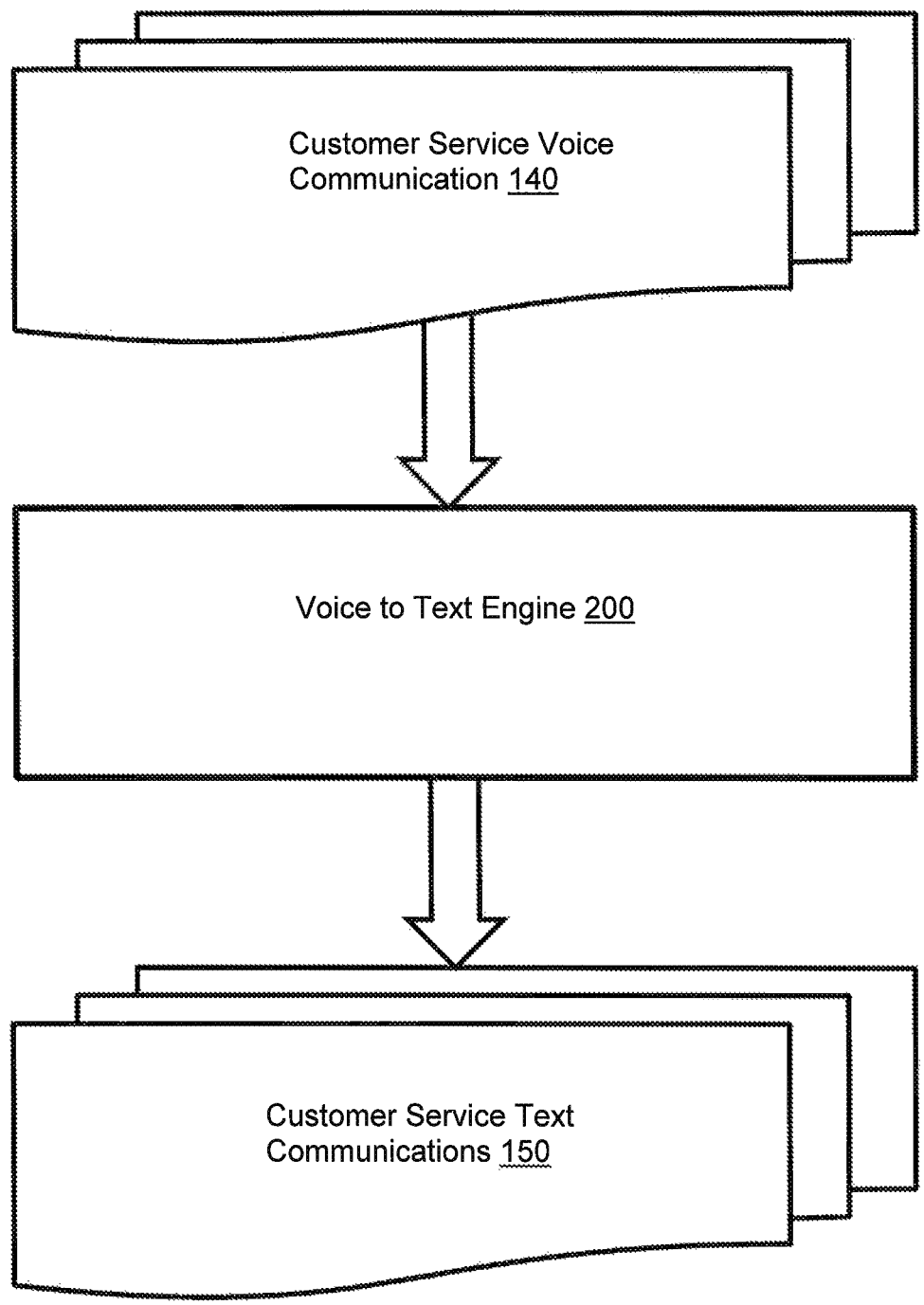
FIG. 2 is a flow diagram illustrating a process where a plurality of customer service voice communications are transformed into a plurality of customer service text communications.

Referring to FIG. 2, the website hosting provider 100, using its own capabilities or those of a third party, may convert the plurality of customer service voice communications 140 into a plurality of customer service text communications 150 using a voice to text engine 200. (Step 1110) The customer service text communications 150 may be stored in any desired format. As non-limiting examples, the customer service text communications 150 may be stored in the format of .txt, .doc, .docx. .pdf, .rtf .wks, .wps, .wpd. or any other text format. Thus, as an example, a voice recording of a hosting customer 190 asking the question of "how do I publish my website" in a way format may be converted into a text record of "how do I publish my website" in a .txt format. Of course, a typical customer service voice communication will likely include a plurality of different questions and/or responses back and forth between the agent and the hosting customer 190 with the entire conversation between the agent and the hosting customer 190 being stored and converted from a voice format to a text format. The customer service text communications 150 may also be stored in the same or a different database 130.

Figure 4:
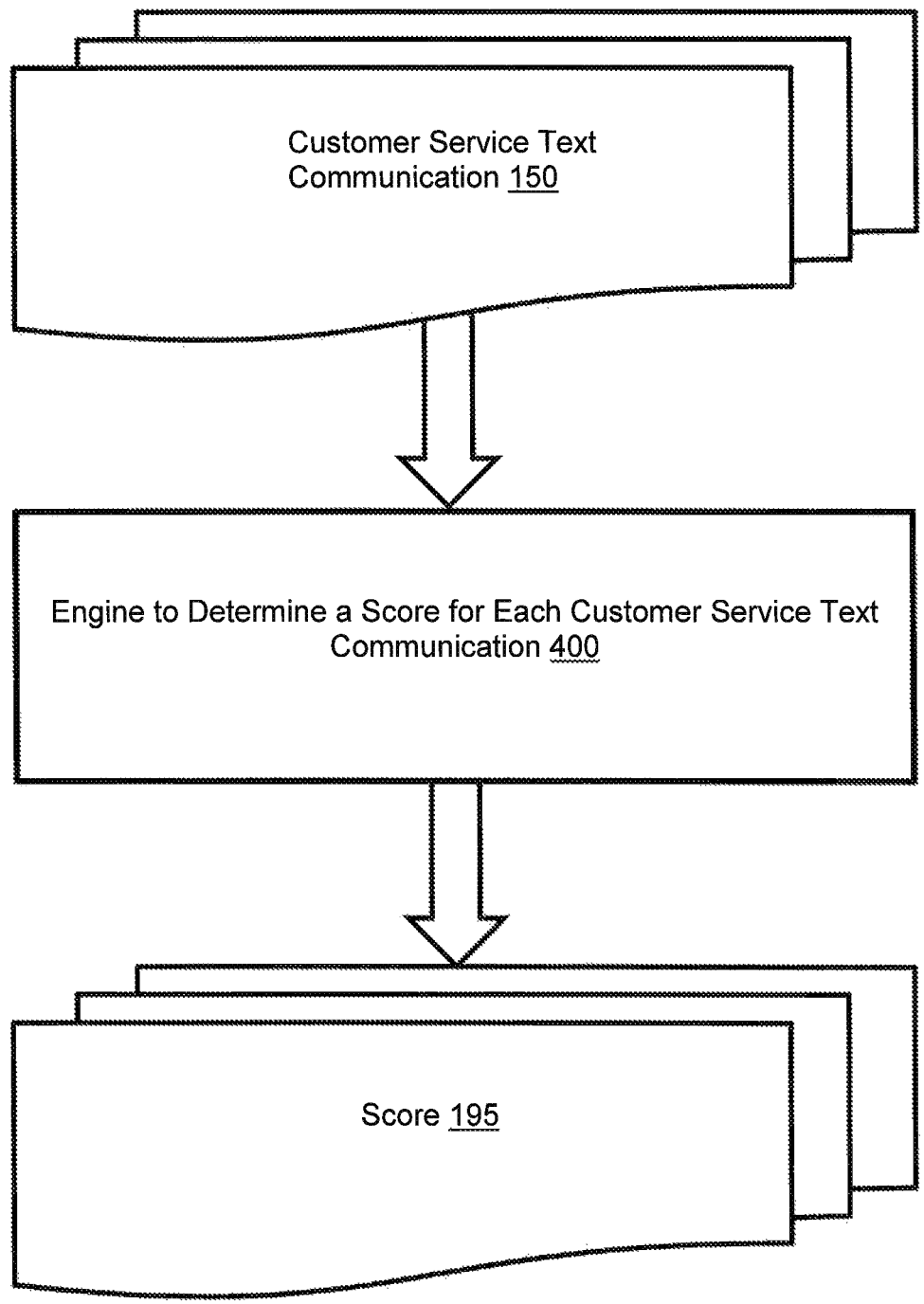
FIG. 4 is a flow diagram illustrating a process where a score is determined for each customer service text communication, wherein a better score reflects efficient and effective customer service while a lower score reflects poor and ineffective customer service.

Referring to FIG. 4, the website hosting provider 100 may derive a score 195 for each customer service text communication in the plurality of customer service text communications 150 stored in the database 130 using an engine to determine a score for each customer service text communication 400. This engine 400 may be any desired type of machine learning engine. The score 195 represents the efficiency and/or effectiveness of the agent resolving the problem/issue of the hosting customer 190 during the telephone call represented by the customer service text communication. In a preferred embodiment, a higher score 195, on any desired scale (such as 1 to 10), indicates a better result for the hosting customer 190 than a lower score 195.

Each score 195 may be derived from a customer service text communication using any desired method. As non-limiting examples, the website hosting provider 100 may derive a score 195 based on an analysis of the customer service text communication. The website hosting provider 100 may determine the length of the customer service text communications 150, the number of questions and responses in the customer service text communication, a handling time of the customer service text communication, and/or the number of additional call-backs the customer had to make to resolve the problem or issue.

As an example method for determining a score 195 for a customer service text communication, a customer service text communication that was short, required few questions and answers, did not require any additional call-backs by the hosting customer 190 and completely resolved the problem for the hosting customer 190 may receive a high score 195 (such as a 9 on a 1 to 10 scale). On the other hand, a customer service text communication that was long (either in length of the text or the time the telephone call lasted), required a large number of back-and-forth questions and answers, took several additional call-backs by the hosting customer 190 and/or did not fully resolve the problem/issue of the hosting customer 190 may receive a low score 195 (such as 2 on a 1 to 10 scale).

Alternatively, the hosting customer 190 may be asked to rate the customer service call after the customer service telephone call is over and the hosting customer's rating may be used as the score 195 for that customer service text communication.

Figure 3:
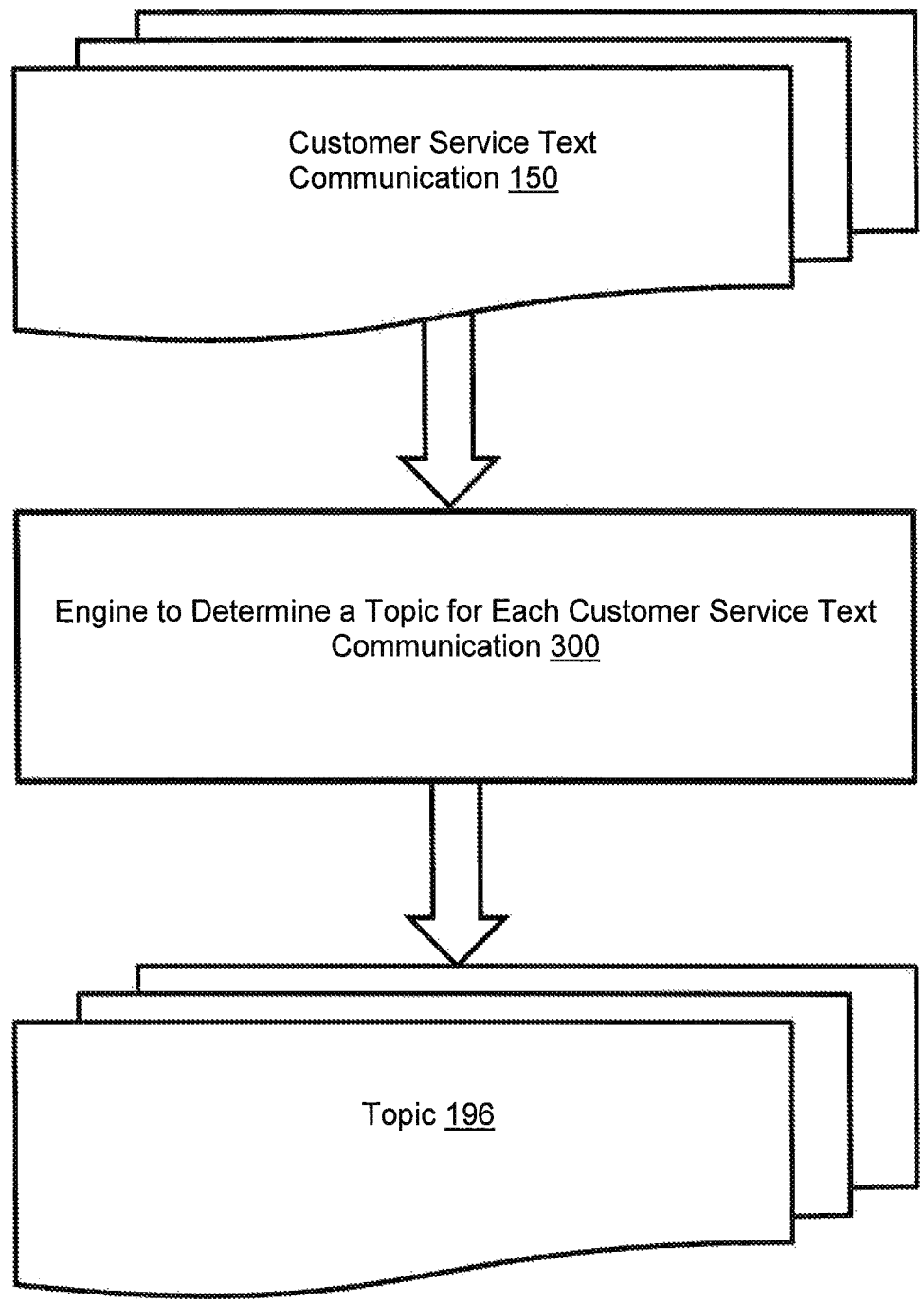
FIG. 3 is a flow diagram illustrating a process where at least one topic is determined from each of the customer service text communications.

Referring to FIG. 3, the website hosting provider 100 may also derive a topic 196 for each customer service text communication in the plurality of customer service text communications 150 using an engine to determine a topic for each customer service text communication 300. This engine may be any desired type of machine learning engine. The website hosting provider 100 may use any desired method to determine one or more topics 196 for each customer service text communication. As a non-limiting example, the website hosting provider 100 may determine a topic 196 for each customer service text communication based on an analysis of the customer service text communication. As a specific example, the website hosting provider 100 may search each customer service text communication for a plurality of different keywords and determine a number of times each keyword is found in each customer service text communications 150. The website hosting provider 100 may determine which keywords appear more often than expected on average. Thus, a keyword which typically is never used except when a particular topic 196 is being discussed may be selected to sue to find the topic 196 even if other keywords are actually found more often in the customer service text communication.

In a preferred embodiment, the website hosting provider 100 compares the number of times a particular keyword is found in a customer service text communication verses the number of times the particular keyword would be expected to be found in an average customer service text communication of the same length. The one or more keywords that are found disproportionally frequently compared to their normal frequency may be used to determine the topic 196 of the customer service text communication, even if the keyword is found only a few times (or fewer than other keywords) in the customer service text communication. Thus, a customer service text communication with the keyword of "nameserver" may be assigned the topic 196 of domain name system (DNS) problem, even if the keyword "nameserver" only appears once or a few times and other keywords appear more frequently in the same customer service text communication if it is determined that the keyword "nameserver" rarely appears except when a hosting customer 190 is having a problem with the hosting customer's DNS records.

Alternatively, the hosting customer 190 may be asked to select the topic 196 from a displayed list before or after the customer service telephone call and the hosting customer's selected topic 196 may be used as the topic 196 for that customer service text communication.

Figure 5:
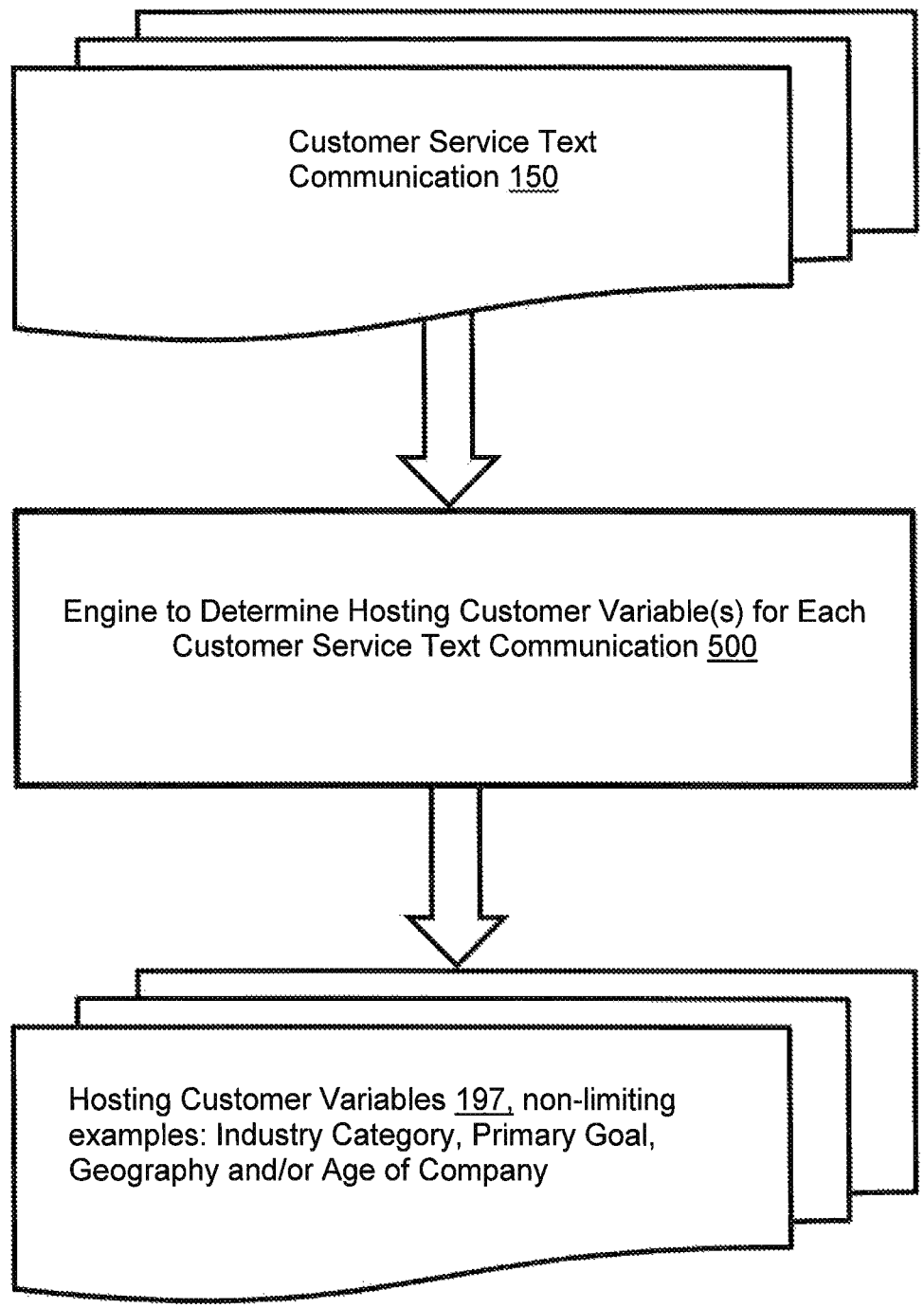
FIG. 5 is a flow diagram illustrating a process where a plurality of hosting customer variables are determined from each of the customer service text communications.

Referring to FIG. 5, the website hosting provider 100 may also derive a plurality of hosting customer variables 197 of the hosting customer 190 for each customer service text communication in the plurality of customer service text communications 150 using an engine to determine hosting customer variables for each customer service text communication 500. This engine 500 may be any desired type of machine learning engine. Non-limiting examples of hosting customer variables 197 may be an industry category of a website 115 of the hosting customer 190, a primary goal of the website 115, a geographical location of the hosting customer 190, and/or an age of the company operating the website 115.

The website hosting provider 100 may use any desired technique for determining the hosting customer variables 197. As a non-limiting example, the hosting customer variables 197 may be entered by the corresponding hosting customer 190 and received by the website hosting provider 100. As another non-limiting example, the hosting customer variables 197 may be determined from the customer service text communication by the website hosting provider 100. As another non-limiting example, the hosting customer variables 197 may be determined by the website hosting provider 100 by accessing a hosting customer account 120 of the corresponding hosting customer 190. Other methods may be used and/or a combination of methods may be used by the website hosting provider 100 to determine the hosting customer variables 197 for each hosting customer 190. (Step 1120)

Figure 6:
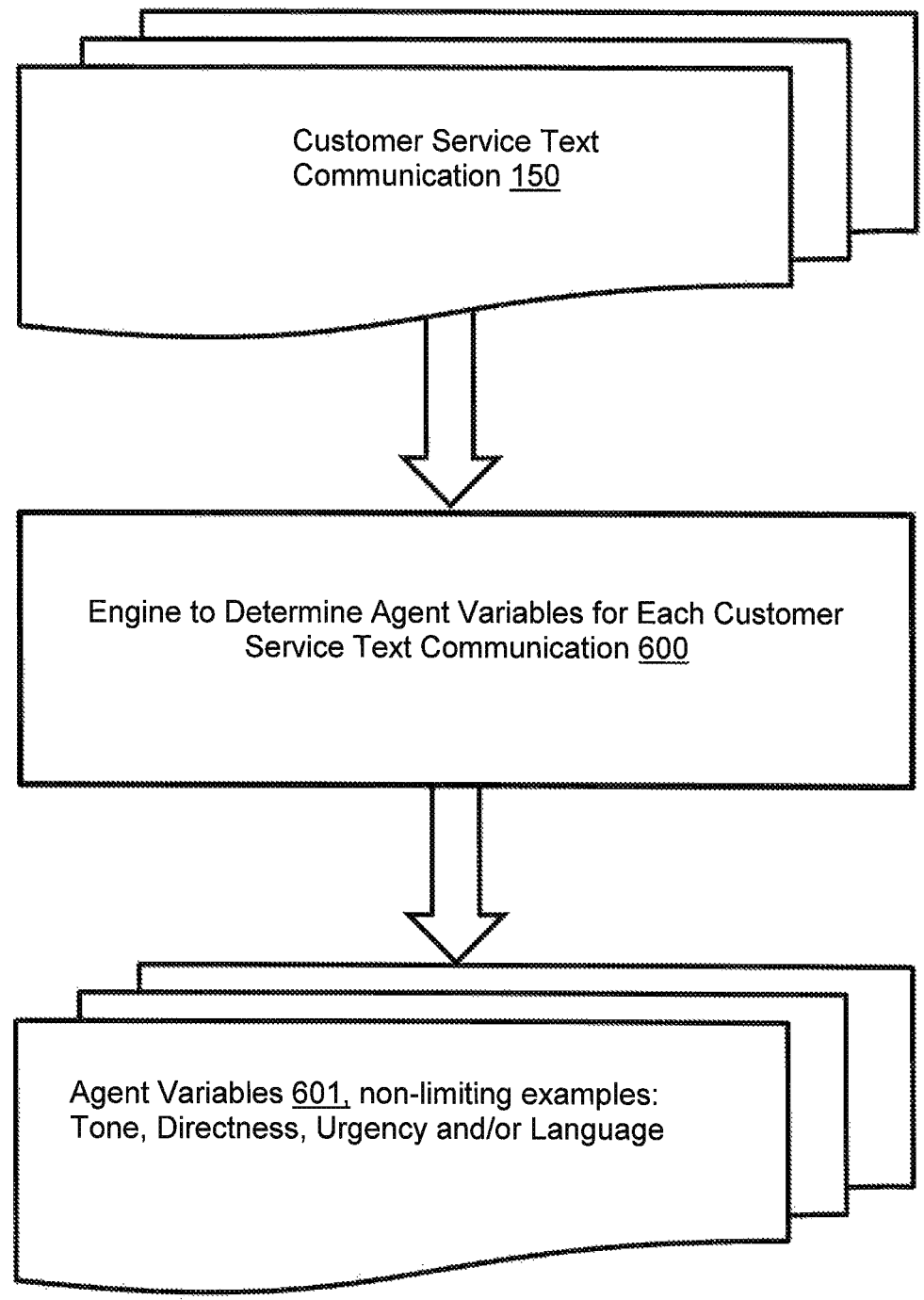
FIG. 6 is a flow diagram illustrating a process where a plurality of agent variables are determined from each of the customer service text communications.

Referring to FIG. 6, the website hosting provider 100 may also derive a plurality of agent variables 601 of a customer service agent for each customer service voice/text communication in the plurality of customer service voice/text communications using an engine 600. This engine 600 may be any desired type of machine learning engine 600. Non-limiting examples of agent customer variables 601 may be the tone, directness, urgency and language used by the agent during the customer service call. The website hosting provider 100 may analyze the customer service voice communications 140 in determining one or more of these agent variables 601.

Figure 7:
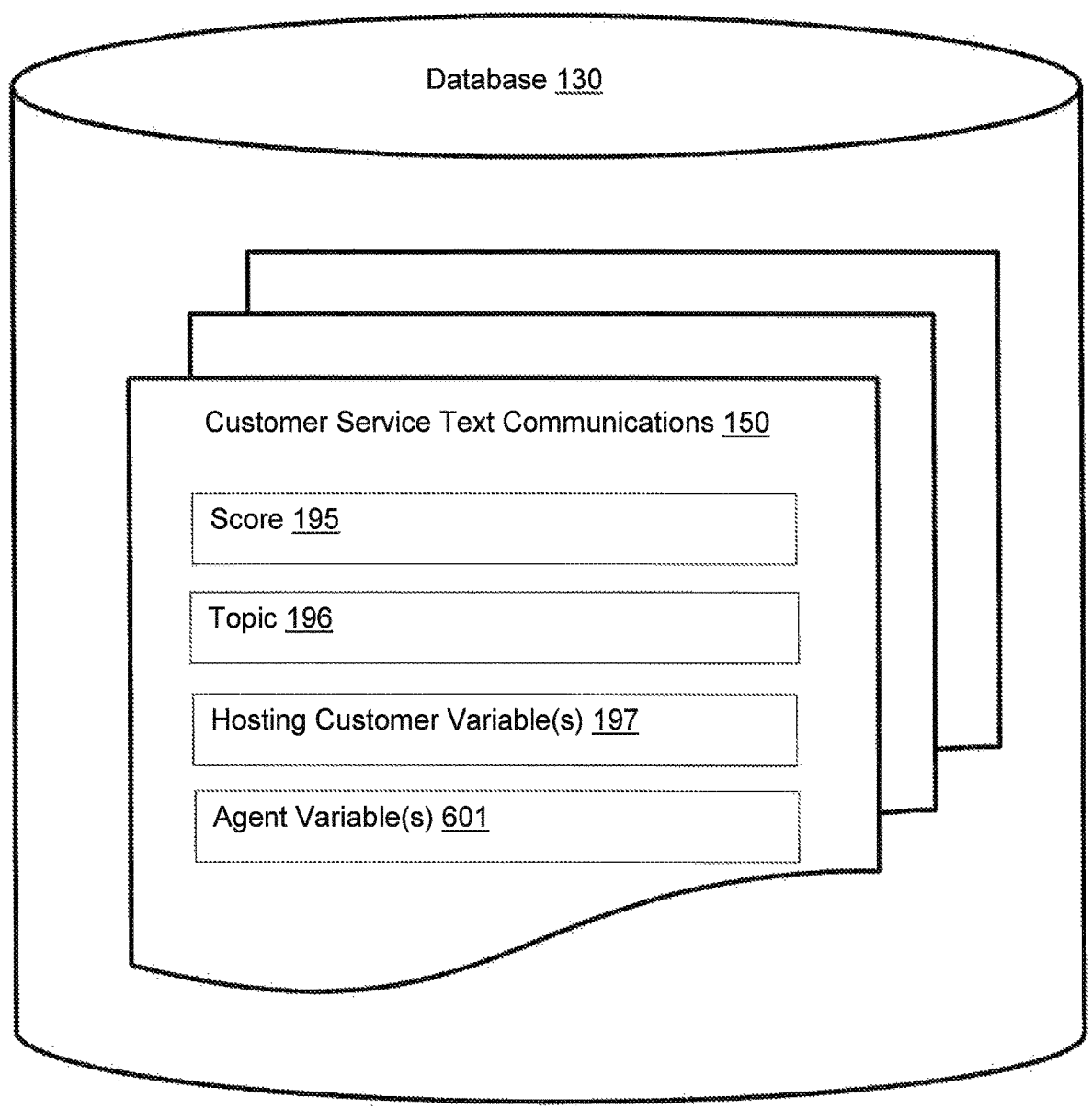
FIG. 7 is an illustration of an example database storing a plurality of customer service text communications and with each customer service text communication being associated with a score, topic, hosting customer variables and agent variables.

Referring to FIG. 7, the website hosting provider 100 may store the score 195, the topic 196, the plurality of hosting customer variables 197 and/or the plurality of agent variable(s) 601 for each customer service text communication in the database 130.

Figure 8:
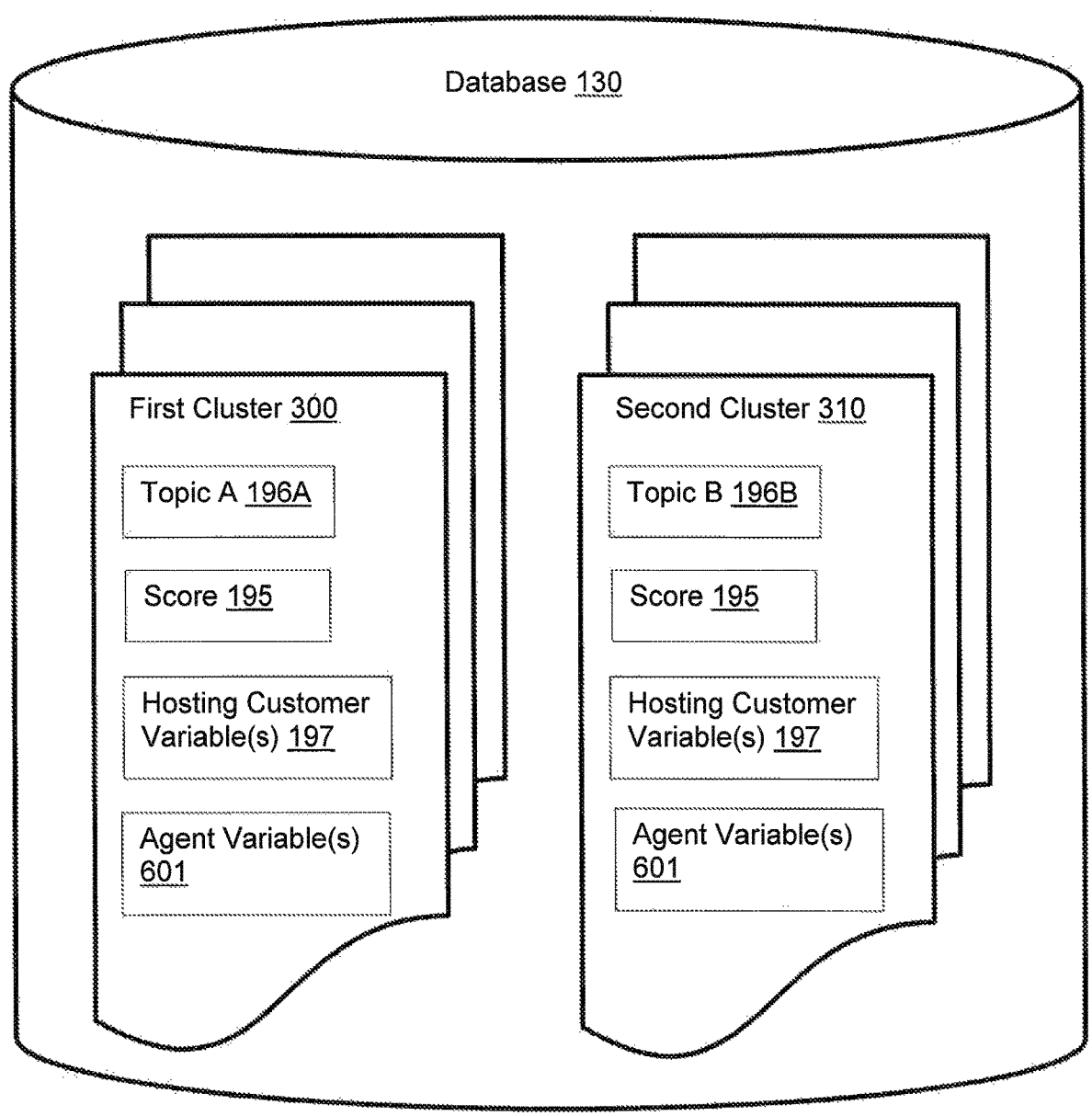
FIG. 8 is an illustration of the example database in FIG. 7, where the plurality of customer service text communications are organized, using any desired method of organizing data, such as using links, into a first cluster of customer service text communications and a second cluster of customer service text communications.

Referring to FIG. 8, the website hosting provider 100 may aggregate, i.e., create, two or more clusters of customer service text communications 150, where each customer service text communication in the same cluster has the same topic 196. (Step 1130) The clusters 300, 310 of customer service text communications 150 do not have to be physically separated, as the clusters 300, 310 may be virtual, such as through the use of a table or other means, to keep track of which customer service text communications 150 are in which cluster 300, 310. All customer service text communications 150 in the plurality of customer service text communications 150 of the same topic 196 should be in the same cluster 300, 310. Thus, there are preferably as many clusters 300, 310 of customer service text communications 150 as there are topics 196.

The website hosting provider 100 may receive a customer service telephone call from one of its hosting customers 190, i.e., a current hosting customer 190, to the communication center 160. The current hosting customer 190 may have a problem or question and wishes to resolve the problem or question by talking with an agent of the website hosting provider 100. The website hosting provider 100 may desire to efficiently and effectively assist the current hosting customer 190 in creating and/or publishing a website 115 of the hosting customer 190 so that the current hosting customer 190 remains a customer of the website hosting provider 100. The website hosting provider 100 will want to help the current hosting customer 190 in the quickest and most efficient manner possible in resolving any problems or questions the current hosting customer 190 may have.

The website hosting provider 100 may determine a topic 196 for the customer service telephone call with the current hosting customer 190. The website hosting provider 100 may use any desired method to determine one or more topics 196 for the customer service telephone call with the current hosting customer 190. As a non-limiting example, the website hosting provider 100 may ask the current hosting customer 190 to select the topic 196 from a displayed list and the current hosting customer's selected topic 196 may be used as the topic 196 for that customer service telephone call. As another non-limiting example, the website hosting provider 100 may review recent error messages sent to the current hosting customer 190 by the website hosting provider 100 or detect recent activities being performed by the current hosting customer 190 in creating and publishing their website 115. The website hosting provider 100 may thus deduce a topic 196 based on the recent error messages and/or the recent activities, particularly if the activities were not successful, attempted by the current hosting customer 190.

Using the determined topic 196 of the customer service telephone call, the website hosting provider 100 may determine which cluster of customer service text communications 150 are related to the same topic 196. Thus, if the website hosting provider 100 determines the current hosting customer 190 has been unsuccessful in attempting to install images onto their website 115, the website hosting provider 100 may determine the topic 196 is how to install images in a website 115. A cluster of customer service text communications 150 that have the same topic 196 as the customer service telephone call may be identified.

The website hosting provider 100 may determine a plurality of hosting customer variables 197 for the current hosting customer 190 that is making a customer service call to the communication center 160 of the website hosting provider 100. Non-limiting examples of hosting customer variables 197 for the current hosting customer 190 may be an industry category of a website 115 of the current hosting customer 190, a primary goal of the website 115, a geographical location of the current hosting customer 190, and/or an age of the company operating the website 115 operated by the current hosting customer 190. (Step 1140)

The website hosting provider 100 may use any desired technique for determining the hosting customer variables 197 of the current hosting customer 190. As a non-limiting example, the hosting customer variables 197 may be entered by the current hosting customer 190 and received by the website hosting provider 100. As another non-limiting example, the hosting customer variables 197 may be determined by the website hosting provider 100 accessing data associated with a hosting customer account 120 of the current hosting customer 190. Other methods may be used and/or a combination of methods may be used by the website hosting provider 100 to determine the hosting customer variables 197 for the current hosting customer 190.

The website hosting provider 100 may apply a machine learning algorithm to a cluster of customer service text communications 150 that have the same topic 196 as the topic 196 determined for the customer service telephone call for the current hosting customer 190. The machine learning algorithm provides the system an ability to learn and improve from experience without the system being explicitly programmed.

Figure 9:
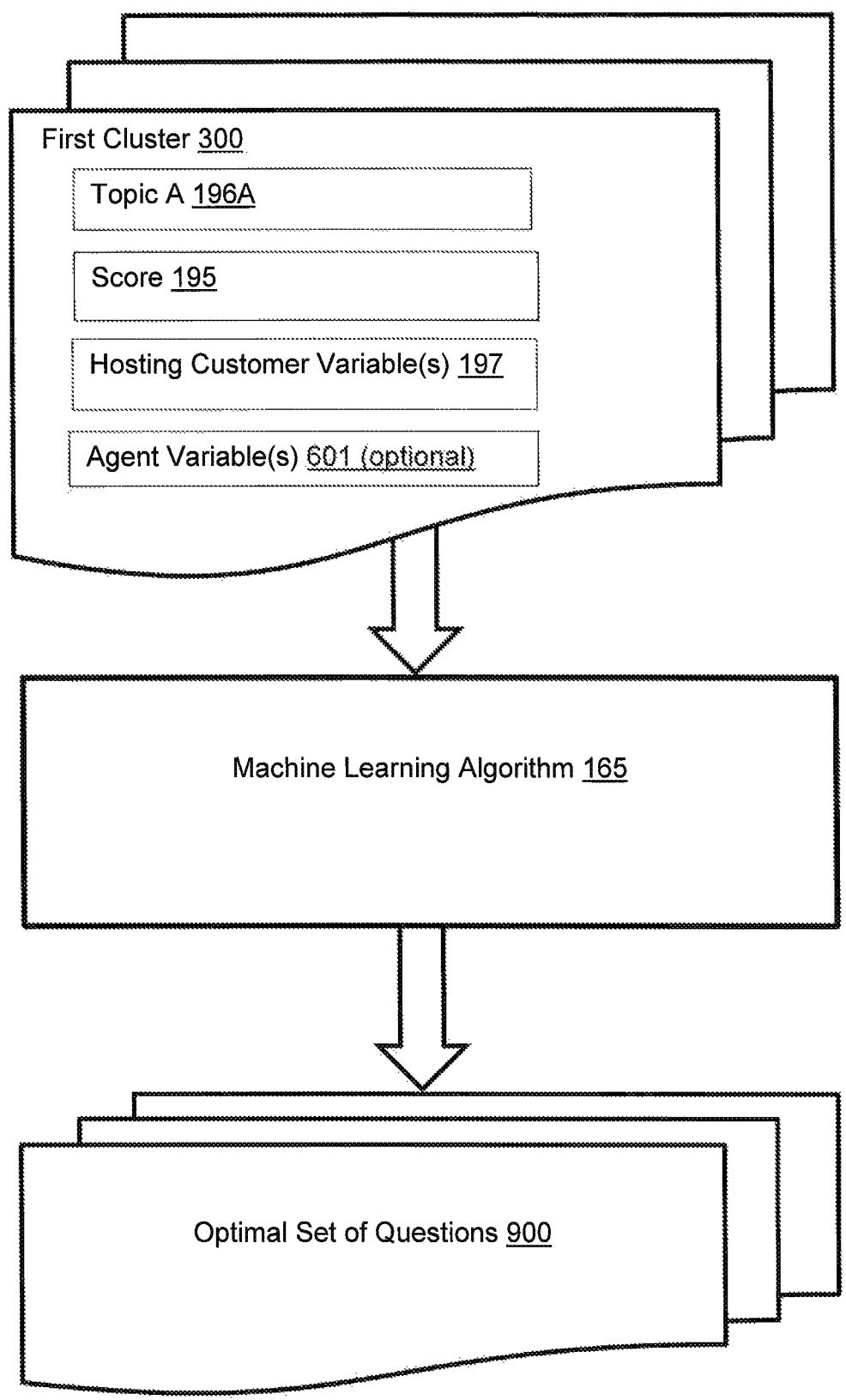
FIG. 9 is a flow diagram illustrating a process of taking a first cluster of customer service text communications and, using a machine learning algorithm, converting the customer service text communications into one or more optimal questions.

Referring to FIG. 9, the machine learning algorithm 165 may determine an optimal set of questions 900 by any desired means. (Step 1200) As a non-limiting example, the optimal questions may be based on the hosting customer variables 197 for the current hosting customer 190 and the score 195 for each customer service text communication in the cluster of customer service text communications 150. In general, the questions that were used in the customer service text communications 150 (that have the same topic 196 and similar hosting customer variables 197 as the hosting customer 190) that have higher scores 195, i.e., produced the best results, are more likely to be part of the optimal set of questions 900. On the other hand, the questions that were used in the customer service text communications 150 (that have the same topic 196 and similar hosting customer variables 197 as the hosting customer 190) that have lower scores 195, i.e., produced poor results, are less likely to be part of the optimal set of questions 900.

The website hosting provider 100 may transmit what it has determined from the machine learning algorithm to be the optimal set of questions 900 to a client device 180 of the current hosting customer 190. The questions may be sent one at a time with each new questions being sent after receiving a response to the previous question. In preferred embodiments, which new question is sent may be selected based on one or more responses from previous questions. Alternatively, the questions may be sent in one or more groups of questions. The questions are preferably transmitted in a format that is easy for the current hosting customer 190 to answer. As non-limiting examples, the optimal questions may be in a True/False, multiple choice, fill in the blank and/or some other format or some combination of these formats.

Figure 10:
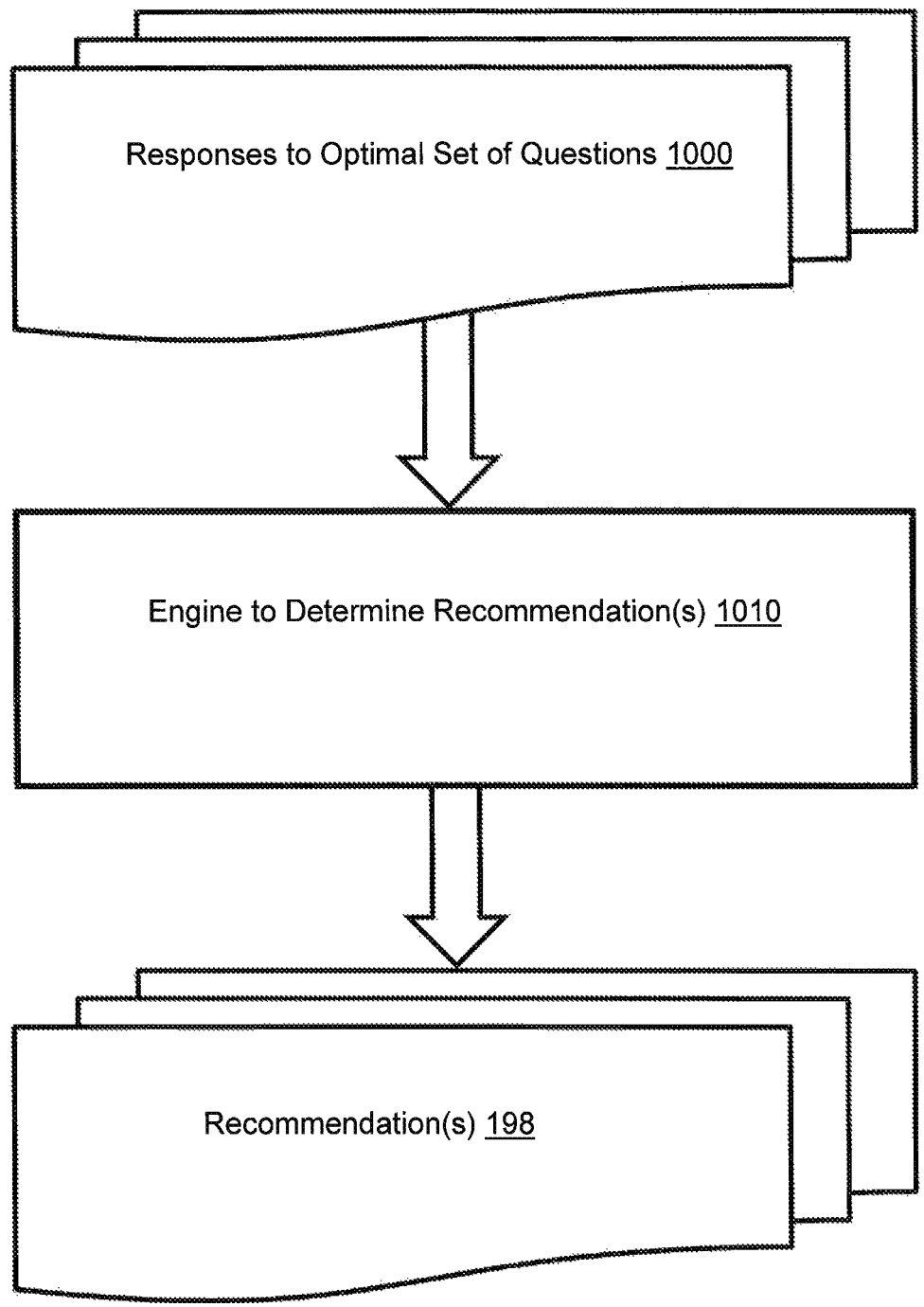
FIG. 10 is a flow diagram illustrating a process of converting one or more response to the optimal questions into one or more recommendations for the hosting customer.

Referring to FIG. 10, the website hosting provider 100 may receive a plurality of responses 1000 to the optimal set of questions 900 from the client device 180 of the current hosting customer 190. (Step 1210) The plurality of responses 1000 may be used as input to an engine 1010 for determining recommendation(s) to be made to the current hosting customer 190. (Step 1220) The recommendations 198 are advice or guidance in creating and/or publishing a website 115 operated by the current hosting customer 190 with the website hosting provider 100. The engine 1010 for determining recommendation(s) may analyze the plurality of customer service text communications 150 having similar responses to questions to see which recommendation(s) produced higher scores 195, fewer call-backs and/or shorter customer service telephone call times. The website hosting provider 100 may communicate the recommendation(s) 198 to the client device 180 of the current hosting customer 190. Thus, the website hosting provider 100 may transmit one or more recommendations 198 to the current hosting customer 190 based on the plurality of responses from the current hosting customer 190. (Step 1230)

The current hosting customer 190, having received one or more recommendations 198 from the website hosting provider 100, may decide to implement none, one or a plurality of recommendations 198. In preferred embodiments, the website hosting provider 100 may have an interface that the hosting customer 190 may use to perform the one or more recommendations 198 on the website 115 of the current hosting customer 190.

The website hosting provider 100 may publish the website 115 of the current hosting customer 190 on one or more website hosting servers 110 so that the website 115 of the current hosting customer 190 becomes available on the Internet 170 to all Internet users. (Step 1240)

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A method comprising the steps of:
receiving by a website hosting provider a plurality of customer service voice communications from a corresponding plurality of hosting customers, wherein the website hosting provider comprises:
  i) a communication center configured to receive the plurality of customer service voice communications from the plurality of hosting customers,
  ii) a database configured to store the plurality of customer service voice communications,
  iii) a website hosting server configured to host a plurality of websites for the plurality of hosting customers, and
  iv) a machine learning algorithm,
wherein each hosting customer in the plurality of hosting customers is hosting a website in the plurality of websites with the website hosting provider and has a customer account with the website hosting provider;
storing by the website hosting provider the plurality of customer service voice communications in the database;
converting by the website hosting provider the plurality of customer service voice communications into a corresponding plurality of customer service text communications;
storing by the website hosting provider the plurality of customer service text communications in the database;
deriving by the website hosting provider a score for each customer service text communication in the plurality of customer service text communications based on an analysis of the customer service text communication;
deriving by the website hosting provider a topic for each customer service text communication in the plurality of customer service text communications based on an analysis of the customer service text communication;
deriving by the website hosting provider a plurality of hosting customer variables of the hosting customer for each customer service text communication in the plurality of customer service text communications, wherein at least one hosting customer variable in the plurality of hosting customer variables is entered by each of the corresponding plurality of hosting customers;
storing by the website hosting provider the score, the topic, the plurality of hosting customer variables for each customer service text communication in the plurality of customer service text communications in the database;
aggregating by the website hosting provider all of the customer service text communications in the plurality of customer service text communications that have a first derived topic into a first cluster;
aggregating by the website hosting provider all of the customer service text communications in the plurality of customer service text communications that have a second derived topic into a second cluster, wherein the first derived topic is different from the second derived topic;
determining by the website hosting provider a first plurality of hosting customer variables for a current hosting customer;
applying by the website hosting provider the machine learning algorithm to the first cluster of customer service text communications to determine an optimal set of questions based on the first plurality of hosting customer variables for the current hosting customer and the score for each customer service text communication in the first cluster of customer service text communications;
receiving by the website hosting provider a plurality of responses to the optimal set of questions from the current hosting customer;
transmitting by the website hosting provider a recommendation to the current hosting customer based on the plurality of responses from the current hosting customer;
creating by the website hosting provider a website of the current hosting customer on the website hosting server, wherein the website is created, at least in part, based on the recommendation to the current hosting customer using the at least one hosting customer variable entered by each hosting customer in the plurality of hosting customers; and
publishing by the website hosting provider the website of the current hosting customer on the website hosting server.

2. The method of claim 1, further comprising the step of:
deriving by the website hosting provider a second plurality of hosting customer variables of the hosting customer for each customer service text communication in the plurality of customer service text communications, wherein at least one hosting customer variable in the second plurality of hosting customer variables is derived directly from data associated with each corresponding customer service text communication in the plurality of customer service text communications.

3. The method of claim 1, further comprising the step of:
deriving by the website hosting provider a second plurality of hosting customer variables of the hosting customer for each customer service text communication in the plurality of customer service text communications, wherein at least one hosting customer variable in the second plurality of hosting customer variables is derived from data associated with each corresponding customer account in the plurality of customer accounts.

4. The method of claim 1, wherein the score for each customer service text communication in the plurality of customer service text communications is based on a customer satisfaction derived from the customer service text communication.

5. The method of claim 1, wherein the score for each customer service text communication in the plurality of customer service text communications is based on a handling time to resolve a topic in each of the plurality of customer service text communications.

6. The method of claim 1, wherein the score for each customer service text communication in the plurality of customer service text communications is based on a number of calls to resolve a topic in each of the plurality of customer service text communications.

7. A method comprising the steps of:
receiving by a website hosting provider a plurality of customer service voice communications from a corresponding plurality of hosting customers, wherein the website hosting provider comprises:
  i) a database configured to store the plurality of customer service voice communications and
  ii) a website hosting server configured to host a plurality of websites for the plurality of hosting customers, and
  iii) a machine learning algorithm,
  wherein each hosting customer in the plurality of hosting customers is hosting a website in the plurality of websites with the website hosting provider and has a customer account with the website hosting provider;
storing by the website hosting provider the plurality of customer service voice communications in the database;
converting by the website hosting provider the plurality of customer service voice communications into a corresponding plurality of customer service text communications;
storing by the website hosting provider the plurality of customer service text communications in the database;
deriving by the website hosting provider a score for each customer service text communication in the plurality of customer service text communications based on an analysis of the customer service text communication;
deriving by the website hosting provider a topic for each customer service text communication in the plurality of customer service text communications based on an analysis of the customer service text communication;
deriving by the website hosting provider a plurality of hosting customer variables of the hosting customer for each customer service text communication in the plurality of customer service text communications, wherein at least one hosting customer • variable in the plurality of hosting customer variables is derived directly from the customer service text communication;
storing by the website hosting provider the score, the topic and the plurality of hosting customer variables for each customer service text communication in the plurality of customer service text communications in the database;
aggregating by the website hosting provider all of the customer service text communications in the plurality of customer service text communications that have a first derived topic into a first cluster;
aggregating by the website hosting provider all of the customer service text communications in the plurality of customer service text communications that have a second derived topic into a second cluster, wherein the first derived topic is a different derived topic from the second derived topic;
determining by the website hosting provider a first plurality of hosting customer variables for a current hosting customer;
applying by the website hosting provider the machine learning algorithm to the first cluster of customer service text communications to determine an optimal set of questions based on the first plurality of hosting customer variables for the current hosting customer and the score for each customer service text communication in the first cluster of customer service text communications;
receiving by the website hosting provider a plurality of responses to the optimal set of questions from the current hosting customer;
transmitting by the website hosting provider a recommendation to the current hosting customer based on the plurality of responses from the current hosting customer;
creating by the website hosting provider a website of the current hosting customer on the website hosting server, wherein the website is created, at least in part, based on the recommendation to the current hosting customer using the at least one hosting customer variable derived directly from each customer service text communication in the plurality of customer service text communication to create the website; and
publishing by the website hosting provider the website of the current hosting customer on the website hosting server.

8. The method of claim 7, further comprising the step of:
deriving by the website hosting provider a second plurality of hosting customer variables of the hosting customer for each customer service text communication in the plurality of customer service text communications, wherein at least one hosting customer variable in the second plurality of hosting customer variables is entered by each of the corresponding plurality of hosting customers.

9. The method of claim 7, further comprising the step of:
deriving by the website hosting provider a second plurality of hosting customer variables of the hosting customer for each customer service text communication in the plurality of customer service text communications, wherein at least one hosting customer variable in the second plurality of hosting customer variables is derived from data associated with each corresponding customer account in the plurality of customer accounts.

10. The method of claim 7, wherein the score for each customer service text communication in the plurality of customer service text communications is based on a customer satisfaction derived from the customer service text communication.

11. The method of claim 7, wherein the score for each customer service text communication in the plurality of customer service text communications is based on a handling time to resolve a topic in each of the plurality of customer service text communications.

12. The method of claim 7, wherein the score for each customer service text communication in the plurality of customer service text communications is based on a number of calls to resolve a topic in each of the plurality of customer service text communications.

13. A method comprising the steps of:
  receiving by a website hosting provider a plurality of customer service voice communications from a corresponding plurality of hosting customers, wherein the website hosting provider comprises:
    i) a database configured to store the plurality of customer service voice communications and
    ii) a website hosting server configured to host a plurality of websites for the plurality of hosting customers, and
    iii) a machine learning algorithm,
      wherein each hosting customer in the plurality of hosting customers has a customer account with the website hosting provider;
  storing by the website hosting provider the plurality of customer service voice communications in the database;
  converting by the website hosting provider the plurality of customer service voice communications into a corresponding plurality of customer service text communications;
  storing by the website hosting provider the plurality of customer service text communications in the database;
  deriving by the website hosting provider a score for each customer service text communication in the plurality of customer service text communications based on an analysis of the customer service text communication;
  deriving by the website hosting provider a topic for each customer service text communication in the plurality of customer service text communications based on an analysis of the customer service text communication;
  deriving by the website hosting provider a plurality of hosting customer variables of the hosting customer for each customer service text communication in the plurality of customer service text communications, wherein at least one hosting customer variable in the plurality of hosting customer variables is derived from each customer account in the plurality of customer accounts;
  storing by the website hosting provider the score, the topic and the plurality of hosting customer variables for each customer service text communication in the plurality of customer service text communications in the database;
  aggregating by the website hosting provider all of the customer service text communications in the plurality of customer service text communications that have a first derived topic into a first cluster;
  aggregating by the website hosting provider all of the customer service text communications in the plurality of customer service text communications that have a second derived topic into a second cluster, wherein the first derived topic is different from the second derived topic;
  deriving by the website hosting provider a first plurality of hosting customer variables for a current hosting customer;
  applying by the website hosting provider the machine learning algorithm to the first cluster of customer service text communications to determine an optimal set of questions based on the first plurality of hosting customer variables for the current hosting customer and the score for each customer service text communication in the first cluster of customer service text communications;
  determining by the website hosting provider a plurality of responses to the optimal set of questions from the current hosting customer;
  transmitting by the website hosting provider a recommendation to the current hosting customer based on the plurality of responses from the current hosting customer;
  creating by the website hosting provider a website of the current hosting customer on the website hosting server, wherein the website is created, at least in part, based on the recommendation to the current hosting customer using the at least one hosting customer variable derived from each customer account in the plurality of customer accounts to create the website; and
  publishing by the website hosting provider a website of the current hosting customer on the website hosting server.

14. The method of claim 13, further comprising the step of:
  deriving by the website hosting provider a second plurality of hosting customer variables of the hosting customer for each customer service text communication in the plurality of customer service text communications, wherein at least one hosting customer variable in the second plurality of hosting customer variables is entered by each of the corresponding plurality of hosting customers.

15. The method of claim 13, further comprising the step of:
  deriving by the website hosting provider a second plurality of hosting customer variables of the hosting customer for each customer service text communication in the plurality of customer service text communications, wherein at least one hosting customer variable in the second plurality of hosting customer variables is derived directly from data associated with each corresponding customer service text communication in the plurality of customer service text communications.

16. The method of claim 13, wherein the score for each customer service text communication in the plurality of customer service text communications is based on a customer satisfaction derived from the customer service text communication.

17. The method of claim 13, wherein the score for each customer service text communication in the plurality of, customer service text communications is based on a handling time to resolve a topic in each of the plurality of customer service text communications.

18. The method of claim 13, wherein the score for each customer service text communication in the plurality of customer service text communications is based on a number of calls to resolve a topic in each of the plurality of customer service text communications.

* * * * *